United States Patent Office 3,351,989
Patented Nov. 14, 1967

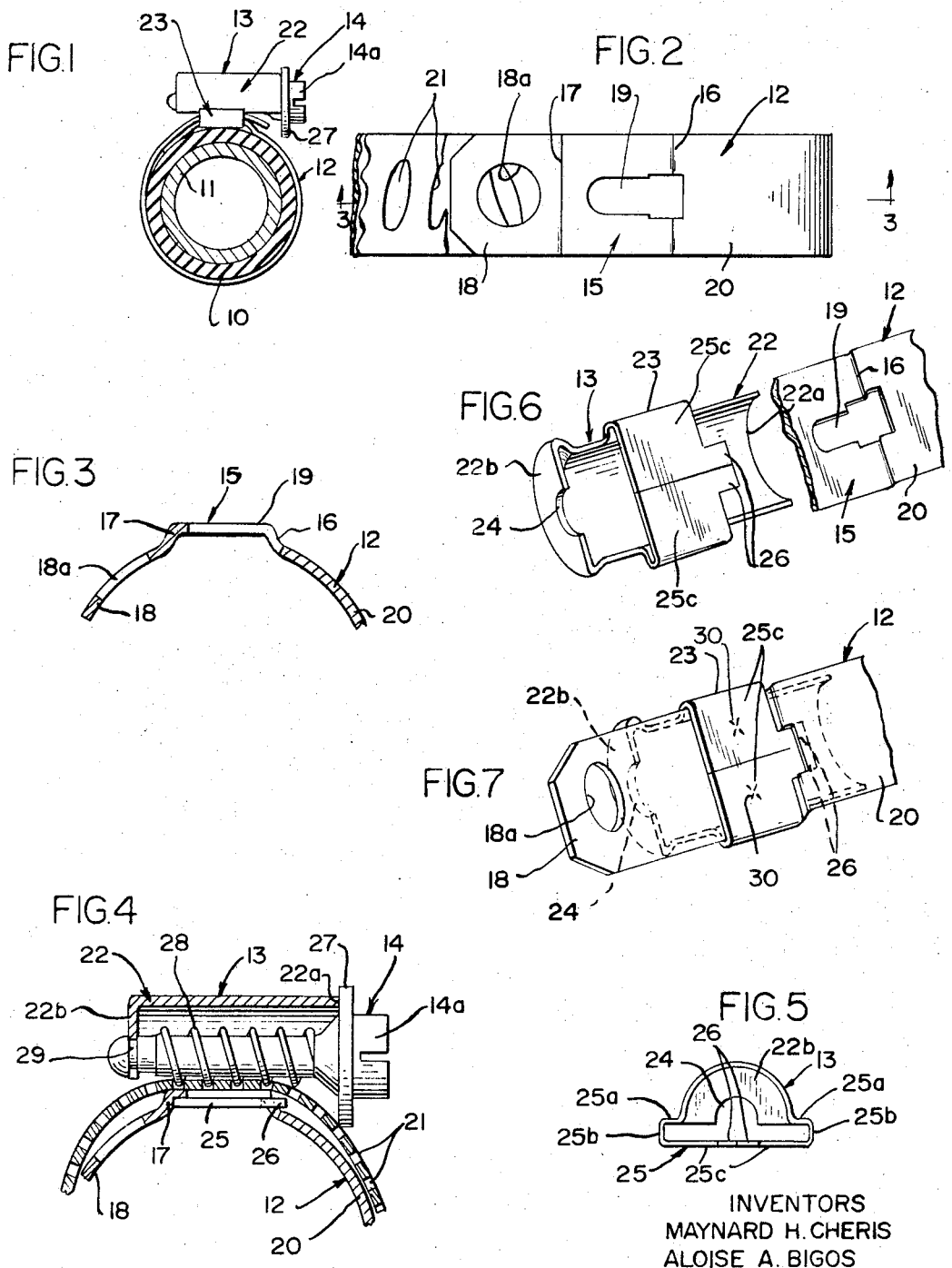
INVENTORS
MAYNARD H. CHERIS
ALOISE A. BIGOS
CHARLES E. BARUFFI
BY Bair, Freeman & Molinare
ATTORNEYS.

3,351,989
HOSE CLAMP
Maynard H. Cheris, Highland Park, Aloise A. Bigos, Berwyn, and Charles E. Baruffi, Wheeling, Ill., assignors to Sterling Automotive Manufacturing Co., Inc., a corporation of Illinois
Filed Dec. 5, 1966, Ser. No. 599,297
3 Claims. (Cl. 24—274)

ABSTRACT OF THE DISCLOSURE

In a clamp that includes an elongated band with screw-thread-receiving slots, a housing secured to one end of the band and a screw in the housing for engaging the band, an improved construction is provided that yields a stronger band and a better securement of the housing to the band. More particularly, the band is provided with a slotted flat bounded by spaced abutment shoulders, and the housing has flat mounting flanges positioned precisely between the abutment shoulders and engaging the band's flat with a precise face-to-face fit to permit of reliable welding therebetween. The slot in the band's flat is smaller than the screw-thread slots in the band, and tabs on the housing's mounting flanges extend through an extension of the flat's slot to interlock, to insure proper assembly of the housing on the band, and to prevent interference with the free end of the band.

---

This invention relates to hose clamps and more particularly to a clamp of the type in which a clamping band is drawn up around a hose coupling by a screw or worm.

Hose clamps of the type in which a screw or worm carried by one end of a flexible band meshes with openings or slots in the other end of the band to draw the band tightly around a hose connection are well known. One of the problems encountered in the manufacture of such clamps has been the mounting of the screw housing on the band. In some constructions heretofore known, a housing member is attached to the band by providing four circumferentially extending tabs at opposite ends of the housing member which extend through openings in the band. In constructions of this type the openings required in the band must be of such a large size, to accommodate and permit insertion of the tabs, as to substantially weaken the band unless the portion of the band that receives the tabs is made of a substantially greater width than would otherwise be required.

In other constructions the screw housing is made of two or more parts in addition to the flexible band. This, however, complicates the assembly operation by increasing the number of parts which must be stocked and handled and also tends to increase the manufacturing costs.

In still other constructions flanges on the housing are welded to the band. However, because the band is normally curved and because it is difficult to obtain a precise degree of curvature in the housing flanges so as to get good face-to-face fit between the housing flanges and the band, the welding is relatively not as reliable as other mechanical connections.

It is accordingly one of the objects of the present invention to provide a hose clamp which is extremely simple in construction, which involves a minimum number of parts, which is easy to assemble, and which does not require an opening in the band of such size as to weaken it, thereby affording an assemblage that is most efficient and of minimum cost.

According to a feature of this invention, the clamp's band is provided with a flat offset adjacent to one end thereof, into which flat two flanges on a screw housing fit and to which flat the flanges are welded. The offset desirably terminates in spaced transverse shoulders against which edges of the flanges seat to locate the housing accurately circumferentially on the band.

According to another feature of the invention the flanges on the screw housing are formed with small tabs at one end only which extend through a narrow opening in one of the shoulders to assist in locating the housing on the band, which construction takes at least a part of the load on the housing when the band is tightened.

The above and other objects and features of the invention will be more readily apparent from the following description when read in connection with the accompanying drawing in which:

FIGURE 1 is a transverse section through a circumferential hose coupling equipped with a clamp embodying the invention;

FIGURE 2 is an enlarged view of the end of the band on which the screw housing is mounted, but with said housing removed and showing other portions of the band broken away;

FIGURE 3 is a partial sectional view of the one end of the band taken substantially on the line 3—3 of FIGURE 2.

FIGURE 4 is a cross-section view similar to FIGURE 3 but showing the elements of the invention assembled as in FIGURE 1;

FIGURE 5 is a reduced end view of the housing for the screw which is used to tighten the band;

FIGURE 6 is a fragmentary exploded perspective view, partly in cross-section, showing the said one end of the band and the screw housing for assembly on said one end of the band; and FIGURE 7 is a view similar to FIGURE 6 but showing the screw housing assembled on said one end of the band.

As shown in FIGURE 1, the hose clamp of the present invention is adapted to clamp a hose 10 which may be formed of rubber, reinforced rubber or the like, against a tubular coupling element 11 which is generally formed of metal and may be roughened or corrugated on its exterior. The hose clamp of the present invention comprises generally a flexible sheet metal band 12 which encircles the hose 10 and which carries thereon adjacent one end thereof a screw housing generally indicated at 13. A screw or worm 14 is rotatably mounted in the housing 13 and meshes with slots or openings in the band 12 to draw the band tightly around the hose in a manner well understood in the art.

As best seen in FIGURES 2 and 3, in the invention herein the band 12 is formed adjacent to but spaced from one end thereof with a flat offset 15 defined in the band by a pair of spaced, transversely extending, shoulders 16 and 17 at opposite ends of the offset. The offset is in a direction radially outwardly of the normal curvature of adjacent portions of the band, as seen in FIGURE 4 where the offset appears to be located between overlapping portions of band 12. The adjacent end of the band as shown at 18 may extend beyond the offset 15, maintaining the normal degree of curvature of band 12 and may be formed with an opening 18a therethrough, although this is not essential. The bottom of the offset between the shoulders 16 and 17, as best seen in FIGURES 3 and 4, is substantially precisely flat from one shoulder to the other. An elongated opening 19 is provided partially in flat offset 15, centrally of the band, and is of a length to extend across the shoulder 16 which is the one furthest from the end 18 of the band. The greatest width of opening 19 is the portion thereof crossing shoulder 16.

The band 12, except for the said one end thereof in which are defined the end 18, offset 15, and adjacent imperforate portion 20, is formed with a series of transversely extending slots or openings 21 whose width is approximately one-half of the width of band 12 and which lie centrally of the width of the band. The openings 21 are of a length and are so shaped as to drivingly receive a portion of the thread on a screw or worm, as described more fully hereinafter, to draw the band 12 tightly around the hose 10. Preferably, the elongated opening 19 is substantially narrower in width than the series of openings 21 so that the band width necessary to provide the requisite strength is determined solely by the size of the band portion that contains openings 21.

The housing 13 of this invention is preferably a shaped sheet metal part that defines a band securing portion 23 and an elongated generally cylindrical screw-receiving portion 22. At the one end of the elongated cylindrical portion against which the head of the screw abuts, as seen at the right in FIGURES 1 and 4, the housing 13 defines an open semi-cylindrical edge 22a. At the opposite end of the cylindrical section the housing has a turned-in flange 22b which is formed with a central saddle or notch 24 to receive and journal a portion of the screw or worm 14.

Spaced centrally of the ends of the cylindrical portion 22, the housing 13 defines a band securing portion 23 that includes flanges 25 which are bent outwardly at 25a and then downwardly at 25b to overlie the edges of the band. The flanges 25 are then bent inwardly toward each other in the form of flat flanges 25c which are of a size longitudinally to terminate closely adjacent to the shoulders 16 and 17, while the flat flanges abut flat offset 15 in a face-to-face relationship. The flat flanges 25c are formed at their one end remote from the flange 22b, with narrow tabs 26 that project therefrom in a direction away from flange 22b and parallel to the longitudinal axis of cylindrical portion 22. The tabs 26 are of a combined width which permits them to pass through the opening 19 at the shoulder 16 and to overlie a portion of adjacent band portion 20 as best seen in FIG. 4.

The screw 14, as best seen in FIGURE 4, is formed at its head end with a slotted head 14a to receive a screwdriver or the like and with an enlarged circular flange 27 adjacent to the head 14a and arranged to abut cylindrical edge 22a. The body of the screw is formed with a spiral thread 28 having a thickness to properly fit into the openings or slots 21 in mesh therewith. At its opposite end the shank of the screw is formed with a reduced-radius groove 29 of substantially the same radius as the saddle or notch 24. When the screw is assembled as shown in FIGURE 4, the flange 22b enters into the groove 29 to provide a bearing for screw 14 and to hold the screw against accidental axial displacement relative to housing 13.

The screw housing is assembled on the band by slipping it over the end 18 of the band with the screw in place and inserting the tabs 26 through the opening 19 at the shoulder 16, as shown in FIGURE 4, and with flanges 25 located between shoulders 16 and 17. At this time the flanges 25 will lie in flat face-to-face relationship against the flat offset 15 and can readily be spot or tack welded thereto at 30 to hold the parts in assembled condition. The depth of offset 15 from the normal plane of band 12 is sufficient to receive therein the thickness of flanges 25. With the screw 14 and housing 13 assembled on band 12, it is possible to insert the free end of band 12 between the screw 14 and the upper surface of offset 15, as can be seen in FIGURE 4. The band 12 may be tightened by turning the screw 14 in a clockwise direction. The thread 28 will mesh with the slots 21 and will draw the free end of the band into and through the housing 13 until the band is adequately tightened around the hose. It will be noted that during tightening the tabs 26 points away from the direction of movement of the free end of band 12 as it enters housing 13, so that there is no tendency for the band to catch, or get hung up, on the terminals of these tabs, and there is no interference with the band tightening. The screw housing will be held securely on the band by engagement of the flanges 25 with the shoulders 16 and 17, and by the welding which, because of the interlock construction of the housing and band, is not required to take all of the strain. The screw 14 is held against longitudinal movement in the housing 13 by the interfitting of flange 22b in slot 29 and by abutment of flange 27 against edge 22a.

The present invention thus provides a relatively simple hose clamp which is extremely strong and rugged, which can be manufactured and assembled at minimum cost and which is extremely efficient in use.

While one embodiment of the invention has been shown and described in detail, it will be understood that this is illustrative only and is not to be taken as a definition of the scope of the invention, reference being had for this purpose to the appended claims.

What is claimed is:

1. In a hose clamp of the type comprising an elongated clamping band with spaced screw-thread-receiving slots therein, a housing on the band, and a screw in the housing arranged to have its threads drivingly engage the slots in the clamping band, the improvement comprising, in combination, a flat defined on said band and offset outwardly of adjacent band portions to define spaced transverse abutment shoulders inwardly of the flat, the housing surrounding said flat on the band and defining flat opposed mounting flanges of a thickness substantially equal to the amount of outward offset of the flat from adjacent band portions, said mounting flanges having a length to fit between said spaced transverse shoulders in longitudinal abutting relation with substantially both said shoulders to prevent longitudinal movement of the housing relative to said band and with the flanges in a flat face-to-face relation with the flat on the band and welded thereto.

2. A hose clamp as in claim 1 wherein the band is provided with an elongated slot in the flat extending through at least one of said transverse shoulders, and the flat mounting flanges on the housing are provided with tabs that extend through said slot in the band to overlie a portion of the band adjacent the offset flat.

3. A hose clamp as in claim 2 wherein the housing defines a cylindrical screw-receiving portion of greater length than said flat mounting flanges, one end of said screw-receiving portion defining an inturned flange that extends toward the band, the tabs on said flat mounting flanges extending in the direction opposite the end defining said inturned flange.

References Cited

UNITED STATES PATENTS

| | | | |
|---|---|---|---|
| 2,477,045 | 7/1949 | Cheney | 24—274 |
| 2,504,836 | 4/1950 | Hill | 24—274 |
| 3,035,319 | 5/1962 | Wolff | 24—274 X |
| 3,162,921 | 12/1964 | Cheris | 24—274 |

FOREIGN PATENTS

| | | |
|---|---|---|
| 225,485 | 1/1963 | Austria. |
| 1,215,738 | 11/1959 | France. |

JAMES L. JONES, Jr., *Primary Examiner.*